United States Patent
Wu et al.

(10) Patent No.: US 10,203,440 B2
(45) Date of Patent: Feb. 12, 2019

(54) POLARIZATION STRUCTURE AND METHOD FOR MANUFACTURING THE SAME, AND DISPLAY PANEL

(71) Applicants: BOE TECHNOLOGY GROUP CO., LTD., Beijing (CN); BEIJING BOE DISPLAY TECHNOLOGY CO., LTD., Beijing (CN)

(72) Inventors: Jun Wu, Beijing (CN); Hongming Zhan, Beijing (CN); Chao Tian, Beijing (CN)

(73) Assignees: BOE TECHNOLOGY GROUP CO., LTD., Beijing (CN); BEIJING BOE DISPLAY TECHNOLOGY CO., LTD., Beijing (CN)

(*) Notice: Subject to any disclaimer, the term of this patent is extended or adjusted under 35 U.S.C. 154(b) by 820 days.

(21) Appl. No.: 14/479,662

(22) Filed: Sep. 8, 2014

(65) Prior Publication Data
US 2015/0323720 A1 Nov. 12, 2015

(30) Foreign Application Priority Data
May 9, 2014 (CN) .......................... 2014 1 0195262

(51) Int. Cl.
*G02B 5/30* (2006.01)
*H01B 13/00* (2006.01)
*G02F 1/1335* (2006.01)

(52) U.S. Cl.
CPC ..... *G02B 5/3058* (2013.01); *G02F 1/133528* (2013.01); *H01B 13/0026* (2013.01); *G02F 2001/133548* (2013.01)

(58) Field of Classification Search
CPC ................................ G02B 5/3058; G03F 7/00
(Continued)

(56) References Cited

U.S. PATENT DOCUMENTS 3,653,741 A * 4/1972 Marks .................. G02B 5/3058
359/487.02
8,896,920 B2 * 11/2014 Jung .................. G02F 1/133536
359/485.05
(Continued)

FOREIGN PATENT DOCUMENTS

CN        1383002 A       12/2002
CN      101782666 A        7/2010
(Continued)

OTHER PUBLICATIONS

Third Chinese Office Action regarding Application No. 2014101952628 dated Jun. 8, 2016. Translation provided by Dragon Intellectual Property Law Firm.
(Continued)

*Primary Examiner* — Ricky D Shafer
(74) *Attorney, Agent, or Firm* — Harness, Dickey & Pierce, P.L.C.

(57) ABSTRACT

The invention discloses a polarization structure and a method for manufacturing the same, and a display panel. The polarization structure comprises a polarization layer, and the polarization layer comprises: a transparent dielectric film; and an oriented nano-metal wire array that is distributed in the transparent dielectric film. The invention provides a novel polarization structure, and the polarization layer of the polarization structure has an oriented nano-metal wire array; because plasma resonance can occur between the oriented nano-metal wire array and an incident lightwave with a certain wavelength, a lightwave parallel to the major axis direction of the nano-metal wire can be absorbed, and a polarization effect may be generated by a lightwave perpendicular to the major axis direction of the nano-metal wire, thereby it has a polarization performance.

17 Claims, 5 Drawing Sheets

(58) Field of Classification Search
 USPC .............................. 359/485.05, 487.03, 900
 See application file for complete search history.

(56) References Cited

U.S. PATENT DOCUMENTS

| | | | | |
|---|---|---|---|---|
| 2006/0034729 | A1* | 2/2006 | Poponin | G01N 21/658 422/82.05 |
| 2007/0139760 | A1* | 6/2007 | Baker | G02B 27/0068 359/320 |
| 2008/0192346 | A1* | 8/2008 | Kim | G02B 5/3058 359/485.05 |
| 2008/0252825 | A1* | 10/2008 | Kim | B82Y 20/00 349/96 |
| 2009/0052029 | A1* | 2/2009 | Dai | B82Y 20/00 359/485.02 |
| 2009/0059367 | A1* | 3/2009 | O'Malley | G02B 5/3058 359/487.01 |
| 2009/0201583 | A1* | 8/2009 | Kamada | B32B 17/10036 359/485.02 |
| 2010/0142047 | A1* | 6/2010 | Fujii | G02B 5/3058 359/485.05 |
| 2010/0148132 | A1* | 6/2010 | Jiang | B82Y 30/00 252/514 |
| 2010/0157426 | A1* | 6/2010 | Matsunami | B29C 55/023 359/487.06 |
| 2011/0075258 | A1* | 3/2011 | Mullen | G02B 5/3058 359/492.01 |
| 2013/0002999 | A1* | 1/2013 | Kumai | G02B 5/3058 349/97 |

FOREIGN PATENT DOCUMENTS

| | | |
|---|---|---|
| CN | 103487987 A | 1/2014 |
| EP | 1980900 A1 | 10/2008 |
| JP | 2007-102174 * | 4/2007 |
| JP | 2013235272 A | 11/2013 |

OTHER PUBLICATIONS

First Office Action regarding Chinese application No. 201410195262.8, dated Sep. 25, 2015. Translation provided by Dragon Intellectual Property Law Firm.
Polyol Synthesis of Uniform Silver Nanowires: A Plausible Growth Mechanism and the Supporting Evidence.
Second Office Action regarding Chinese application No. 201410195262.8, dated Feb. 3, 2016. Translation provided by Dragon Intellectual Property Law Firm.

* cited by examiner

POLARIZATION STRUCTURE AND METHOD FOR MANUFACTURING THE SAME, AND DISPLAY PANEL

CROSS REFERENCE OF THE RELATED APPLICATION

The present application claims priority to the Chinese application No. 201410195262.8 filed on May 9, 2014, entitled with "Polarization Structure and Method for Manufacturing the Same, and Display Panel", the entire contents of which are incorporated herein by reference.

FIELD OF THE INVENTION

The present invention relates to the field of display technologies, and in particular, to a polarization structure and a method for manufacturing the same, and a display panel.

DESCRIPTION OF THE PRIOR ART

In a conventional thin-film transistor liquid crystal display (TFT-LCD), the dark state and the bright state are generally controlled by the optical anisotropy of the liquid crystal molecules and the polarization action of a sheet polarizer. A sheet polarizer of the prior art mainly includes the following types: reflective sheet polarizer, birefractive sheet polarizer, dichroic sheet polarizer and scattering sheet polarizer.

The existing sheet polarizer is made by stretching an iodine-series dye, it has a strong hygroscopicity, and it is attached to the surface of a display panel. Because it tends to shrink at a high temperature and a high humidity or at a low temperature, problems such as light leakage and the like may occur, especially for large-sized display panels.

SUMMARY OF THE INVENTION

Therefore, the invention provides a polarization structure and a method for manufacturing the same, and a display panel, thereby solving the problem that light leakage tends to occur in an existing sheet polarizer.

In order to solve the above technical problem, the invention provides the following technical solutions.

According to an aspect of the invention, the invention provides a polarization structure which comprises a polarization layer, wherein the polarization layer comprises:

a transparent dielectric film; and an oriented nano-metal wire array that is distributed in the transparent dielectric film.

In an embodiment of the invention, the nano-metal wire array is provided with multiple layers, each layer comprises a plurality of oriented nano-metal wires, and the nano-metal wires of the adjacent layers are provided correspondingly.

In an embodiment of the invention, the transparent dielectric layer is formed of silicon dioxide or a resin.

In an embodiment of the invention, the nano-metal wire is a nano-silver (Ag) wire or a nano-aluminium (Al) wire.

In an embodiment of the invention, the polarization structure further comprises:

a substrate, wherein the polarization layer is provided on the substrate, and the substrate is a base substrate, an array substrate or a color filter substrate.

According to another aspect of the invention, the invention further provides a display panel, comprising two above polarization structures that are provided correspondingly, wherein the light absorption axis of the polarization layer of the first polarization structure is orthogonal to that of the polarization layer of the second polarization structure.

According to still another aspect of the invention, the invention further provides a method for manufacturing a polarization structure, comprising:

a step of forming a polarization layer, wherein the polarization layer comprises: a transparent dielectric film; and an oriented nano-metal wire array that is distributed in the transparent dielectric film.

In an embodiment of the invention, the step of forming a polarization layer specifically comprises:

Step S111: forming a nano-metal wire array via a patterning process;

Step S112: forming a transparent dielectric film on the nano-metal wire array; and when it requires to form a nano-metal wire array provided with multiple layers, Step S111 and Step S112 are repeated in turn until a nano-metal wire array provided with multiple layers is formed.

In an embodiment of the invention, the step of forming a polarization layer specifically comprises:

forming a nano-metal wires via a polyvinylpyrrolidone-induced process;

dispersing the nano-metal wires into a transparent dielectric solution; and coating the transparent dielectric solution containing the nano-metal wires on the base substrate, and performing nitrogen gas diffusion or stretch processing to form an oriented nano-metal wire array.

In an embodiment of the invention, the step of forming a nano-metal wires via a polyvinylpyrrolidone-induced process specifically comprises:

forming nano-metal particles in a solvent of glycol and polyvinylpyrrolidone with a first concentration by using metal nitrate as a source material of the metal;

adding the nano-metal particles into a solvent of glycol and polyvinylpyrrolidone with a second concentration to form nano-metal rods, and removing the minor part of ball-shaped nano-metal particles via centrifugal separation, wherein the second concentration is larger than the first concentration; and adding the nano-metal rods into a solvent of glycol and polyvinylpyrrolidone with a third concentration to form nano-metal wires, wherein the third concentration is larger than the second concentration.

In an embodiment of the invention, the step of forming a nano-metal wires via a polyvinylpyrrolidone-induced process specifically comprises:

dissolving a metal nitrate in a glycol solution to obtain a first solution;

dissolving polyvinylpyrrolidone in a glycol solution to obtain a second solution; and adding the first solution and the second solution dropwise into a glycol solution at a first temperature, reacting by stirring to form nano-metal wires, wherein the first temperature is higher than or equal to 160° C.

In an embodiment of the invention, the nano-metal wire is a nano-silver (Ag) wire or a nano-aluminium (Al) wire.

In an embodiment of the invention, when the nano-metal wire is nano-silver wire, the dissolubility of the first solution is 0.25 mol/L, and the dissolubility of the second solution is 0.19 mol/L; the first temperature may be 160° C.

The above technical solutions of the invention has the beneficial effect as follows:

A novel polarization structure is provided, wherein the polarization layer of the polarization structure has an oriented nano-metal wire array; because plasma resonance can occur between the oriented nano-metal wire array and an incident lightwave with a certain wavelength, a lightwave parallel to the major axis direction of the nano-metal wire can be absorbed, and a polarization effect may be generated by a lightwave perpendicular to the major axis direction of the nano-metal wire, thereby it has a polarization performance. Because the polarization structure of the invention is not made by stretching an iodine-series dye, problems can be solved that the existing sheet polarizer tends to shrink at a high temperature and a high humidity or at a low temperature and light leakage tends to occur.

DETAILED DESCRIPTION OF THE PREFERRED EMBODIMENTS

Figure 1:
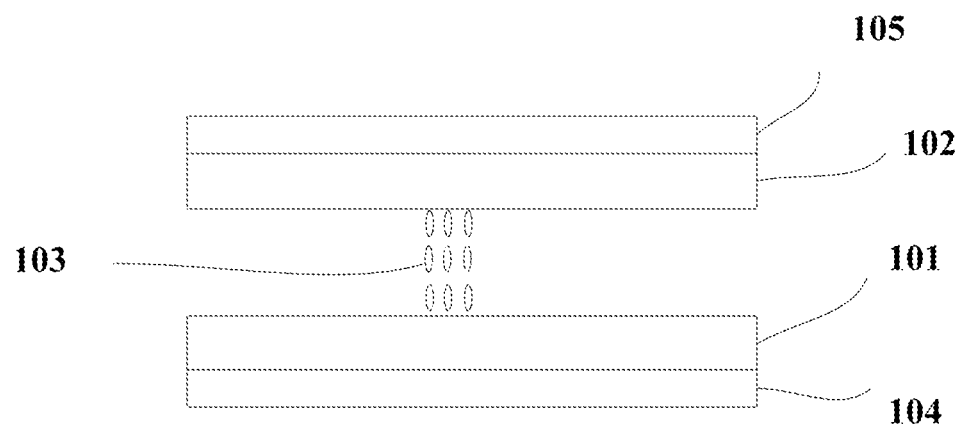
FIG. 1 is a structural representation of a liquid crystal display panel in the prior art.

First of all, the polarization feature of a nano-metal wire will be illustrated.

The polarization feature of a nano-metal wire is generate by the oscillation absorption of conduction electrons in the metal, i.e., the plasma oscillation mechanism of an electron. It may be briefly construed as that light energy is converted into heat energy under the action between a photon and an outer-shell electron of a metal.

The light-absorbing direction of a nano-metal wire is related to the arranging direction of the nano-metal wire, a lightwave parallel to the major axis direction of the nano-metal wire can be absorbed, and a polarization effect may be generated by a lightwave perpendicular to the major axis direction of the nano-metal wire, thereby it has a polarization performance. The light-absorbing coefficient is related to the proportion or density of the nano-metal wires, the structure of the metal wire, the material of the metal and the incident lightwave.

The polarization structure of the invention makes use of the polarization feature of a nano-metal wire.

In order to make the technical problems to be solved, the technical solutions and the advantages of the invention more apparent, a detailed description will be given below in conjunction with the drawings and specific embodiments of the invention.

According to an embodiment of the invention, the invention provides a polarization structure which includes a polarization layer, wherein the polarization layer includes:

a transparent dielectric film; and an oriented nano-metal wire array that is distributed in the transparent dielectric film.

In an embodiment of the invention, the transparent dielectric film may be formed of silicon dioxide, a resin or other transparent dielectrics, and the resin may be an epoxy resin or a resin material of other types.

The nano-metal wire may be a nano-silver (Ag) wire, a nano-aluminium (Al) wire or a nano-metal wire of other types.

This embodiment provides a novel polarization structure, wherein the polarization layer of the polarization structure has an oriented nano-metal wire array; because plasma resonance can occur between the oriented nano-metal wire array and an incident lightwave with a certain wavelength, a lightwave parallel to the major axis direction of the nano-metal wire can be absorbed, and a polarization effect may be generated by a lightwave perpendicular to the major axis direction of the nano-metal wire, thereby it has a polarization performance. Because the polarization structure of the invention is not made by stretching an iodine-series dye, problems can be solved that the existing sheet polarizer tends to shrink at a high temperature and a high humidity or at a low temperature and light leakage tends to occur.

The nano-metal wire array according to one embodiment of the invention may be provided with one layer or may be provided with multiple layers.

When the nano-metal wire array is provided with multiple layers, it is equivalent to that the thickness or the number of layers of the nano-metal wire is increased, and correspondingly, the light absorbance of the nano-metal wire is increased, so that the degree of polarization of the polarization layer may be improved.

In an embodiment of the invention, when the nano-metal wire array is provided with multiple layers, each layer comprises a plurality of oriented nano-metal wires, and the nano-metal wires of the adjacent layers are provided correspondingly.

The polarization layer according to the embodiment of the invention may be manufactured independently and then applied to a color filter substrate or an array substrate; or it may act as a layer of the color filter substrate or the array substrate and be formed at the same time as the color filter substrate or the array substrate.

When the polarization layer is manufactured independently, the polarization structure may further include a substrate, wherein the polarization layer is provided on the substrate, and the substrate is a base substrate, wherein the base substrate acts as a supporting structure of the polarization layer. The base substrate may a glass substrate, etc.

When the polarization layer acts as a layer of the color filter substrate or the array substrate and is formed at the same time as the color filter substrate or the array substrate, the polarization structure may further include a substrate, wherein the polarization layer is provided on the substrate, and the substrate is an array substrate or a color filter substrate.

In an embodiment of the invention, when the substrate is an array substrate, the polarization layer may be directly formed on the base substrate of the array substrate and located between the base substrate of the array substrate and the functional layer of the thin-film transistor (TFT). When the substrate is a color filter substrate, the polarization layer may be directly formed on the base substrate of the color filter substrate, and the polarization layer may be located between the base substrate of the color filter substrate and the CF functional layer of the color filter substrate.

However, the polarization layer may also be provided at other positions of the array substrate or the color filter substrate, for example, on the outer surface of the array substrate or the color filter substrate.

In an embodiment of the invention, in order to prevent that an adverse effect occurs between the polarization layer and other conducting material layers of the array substrate or the color filter substrate, the transparent dielectric film in the polarization layer is an insulating transparent dielectric film.

However, the transparent dielectric film may also be a non-insulating transparent dielectric film.

When the polarization layer acts as a layer of the array substrate or the color filter substrate, because the polarization layer and the array substrate or the color filter substrate are manufactured at the same time, production cost can be lowered, and the defects related to the independent manufacturing of a sheet polarizer can be avoided.

Figure 2:
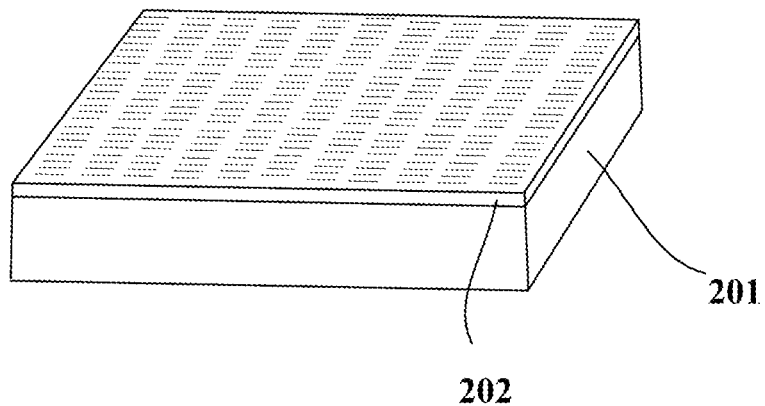
FIG. 2 is a structural representation of a polarization structure according to one embodiment of the invention.

Referring to FIG. 2, it is a structural representation of a polarization structure according to one embodiment of the invention. The polarization structure includes: a substrate 201; and a polarization layer 202 that is formed on the substrate 201.

Figure 3:
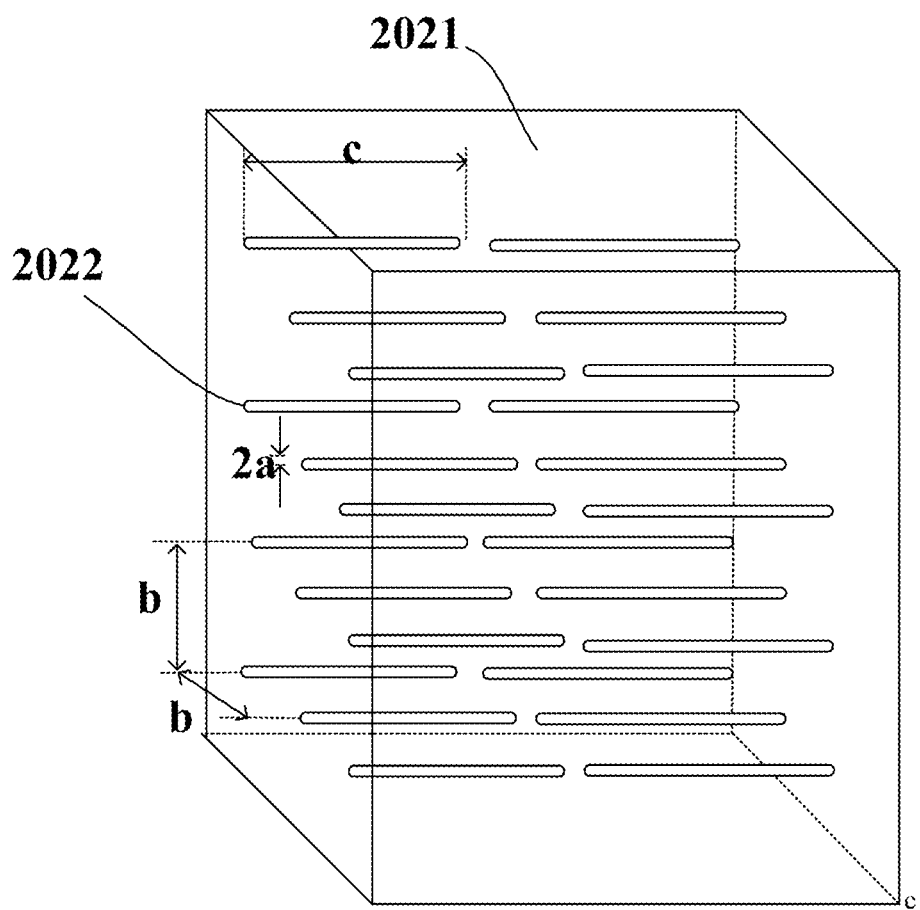
FIG. 3 is a structural representation of the polarization layer in FIG. 2.

Referring to FIG. 3, it is a structural representation of the polarization layer in FIG. 2. The polarization layer includes: a transparent dielectric film 2021; and an oriented nano-metal wire array 2022 that is distributed in the transparent insulating dielectric film 2021; wherein, the nano-metal wire array 2022 is provided with multiple layers, and the arranging structures of different layers of nano-metal wire arrays are the same. In the embodiment of the invention, the pitches between the nano-metal wires on the same row are equal to each other, and the pitches between the nano-metal wires on the same column are equal to each other.

In FIG. 3, 2a is the diameter of the nano-metal wire, b is the pitch between the nano-metal wires, and c is the length of the nano-metal wire. By adjusting the values of the parameters a, b and c, the wavelength range of a polarized light emitted by the polarization structure may be regulated.

Figure 4:
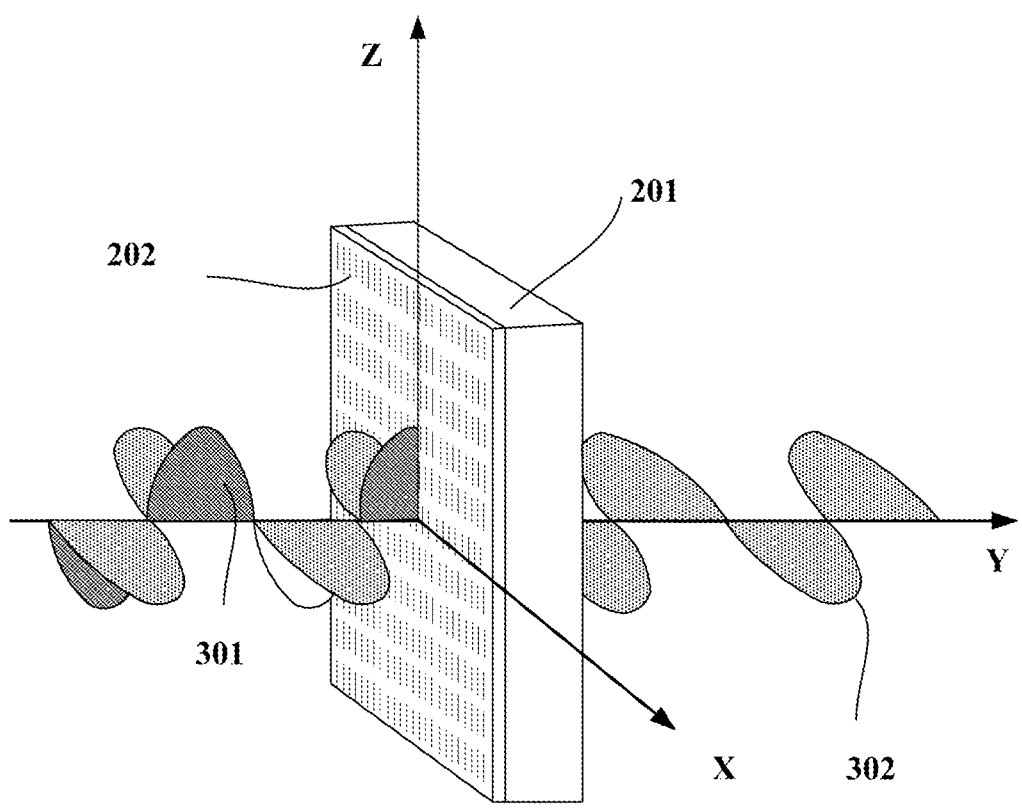
FIG. 4 is a schematic diagram showing the light path of a light that passes through the polarization structure in FIG. 2.

Referring to FIG. 4, it is a schematic diagram showing the light path of a light that passes through the polarization structure in FIG. 2. It may be seen from FIG. 4 that after an incident light 301 passes through the polarization structure implemented by the invention, the light with a polarization direction parallel to the major axis direction of the nano-metal wire will be absorbed, and a polarized light 302 with a polarization direction perpendicular to the major axis direction of the nano-metal wire will pass through.

According to another embodiment of the invention, the invention further provides a display panel, which includes two polarization structures according to the above embodiments that are provided correspondingly, wherein the absorption axis of the polarization layer of the first polarization structure and the absorption axis of the polarization layer of the second polarization structure are orthogonal to each other.

In an embodiment of the invention, the first polarization structure is an array substrate, and the second polarization structure is a color filter substrate.

Figure 5:
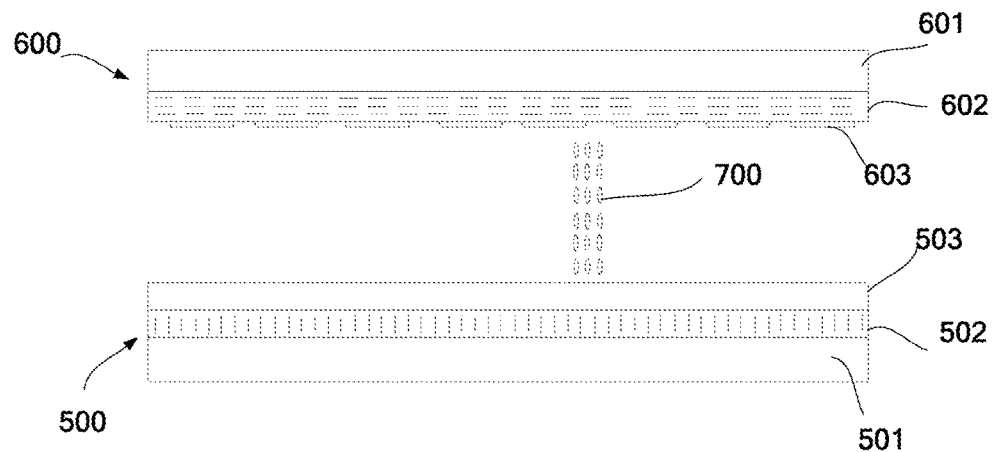
FIG. 5 is a structural representation of a display panel according to one embodiment of the invention.

Referring to FIG. 5, it is a structural representation of a display panel according to one embodiment of the invention. The display panel includes: an array substrate 500, a color filter substrate 600, and a liquid crystal layer 700 provided between the array substrate 500 and the color filter substrate 600.

The array substrate 500 includes: a base substrate 501, a polarization layer 502 and a TFT functional layer 503. Wherein, the polarization layer 502 is located between the base substrate 501 and the TFT functional layer 503. The TFT functional layer 503 mainly includes: a gate metal layer, a gate insulating layer, an active layer, a source-drain metal layer, a passivation layer and a pixel electrode layer, etc., and the invention is not limited thereto.

The color filter substrate 600 includes: a base substrate 601, a polarization layer 602 and a CF functional layer 603. Wherein, the polarization layer 602 is located between the base substrate 601 and the CF functional layer 603. The CF functional layer 603 mainly includes a color resin layer.

Figure 6:
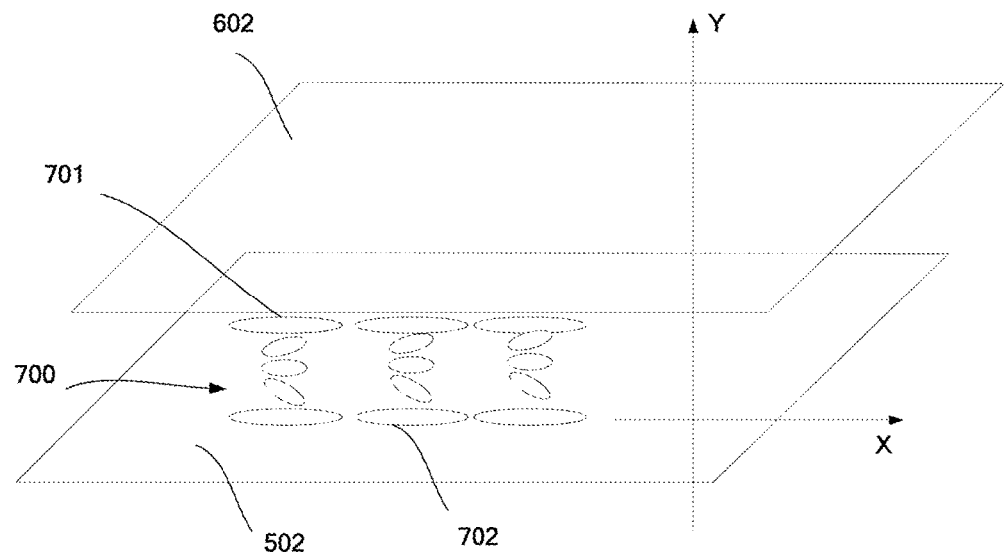
FIG. 6 is a schematic diagram showing the light path of a light that passes through an ADS (or FFS)-mode display panel.

Referring to FIG. 6, it is a schematic diagram showing the light path of a light that passes through an ADS (or FFS)-mode display panel. In an ADS (or FFS)-mode display panel, the major axis direction of a liquid crystal molecule 701 on the uppermost layer and a liquid crystal molecule 702 on the bottommost layer is parallel to the X-axis direction in the figure, and when an incident light emitted by a backlight source passes through the polarization layer 502 of the array substrate, the polarization layer 502 absorb the light parallel to the major axis direction of the nano-metal wires thereon, and the light (the first polarized light) perpendicular to the major axis direction of the nano-metal wire can pass through, wherein the polarization direction of the first polarized light is parallel to the major axis direction of the liquid crystal molecule 702 on the undermost layer; after the first polarized light passes through the liquid crystal layer 700, it is converted into a second polarized light with a direction parallel to the major axis direction of the liquid crystal molecule 701 on the uppermost layer; after the second polarized light passes through the polarization layer 602 of the color filter substrate, the polarization layer 602 absorbs the light parallel to the major axis direction of the nano-metal wires thereon, and the light perpendicular to the major axis direction of the nano-metal wire (the third polarized light) passes through, wherein the direction of the third polarized light is perpendicular to the major axis direction of the liquid crystal molecule 701 on the uppermost layer.

Figure 7:
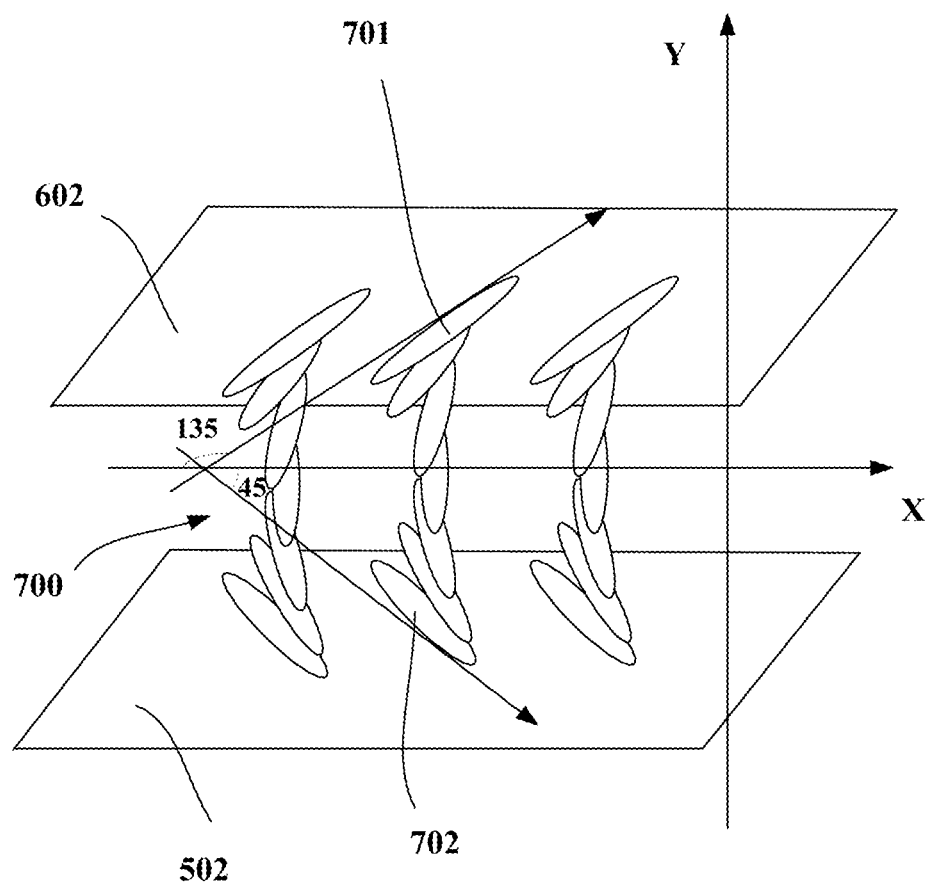
FIG. 7 is a schematic diagram showing the light path of a light that passes through an TN-mode display panel.

Referring to FIG. 7, it is a schematic diagram showing the light path of a light that passes through an NT-mode display panel. In a TN-mode display panel, the major axis direction of the liquid crystal molecule 702 on the bottommost layer forms an included angle of 45° with the X-axis direction in the figure, and the major axis direction of the liquid crystal molecule 701 on the uppermost layer forms an included angle of 135° with the X-axis direction in the figure; after an incident light emitted by a backlight source passes through the polarization layer 502 of the array substrate, the polarization layer 502 absorb the light parallel to the major axis direction of the nano-metal wires thereon, and the light (the first polarized light) perpendicular to the major axis direction of the nano-metal wire can pass through, wherein the direction of the first polarized light is parallel to the major axis direction of the liquid crystal molecule 702 on the bottommost layer; after the first polarized light passes through the liquid crystal layer, it is converted into a second polarized light with a direction parallel to the major axis direction of the liquid crystal molecule 701 on the uppermost layer; after the second polarized light passes through the polarization layer 602 of the color filter substrate, the polarization layer 602 absorbs the light parallel to the major axis direction of the nano-metal wires thereon, and the light perpendicular to the major axis direction of the nano-metal wire (the third polarized light) passes through, wherein the direction of the third polarized light is perpendicular to the major axis direction of the liquid crystal molecule 701 on the uppermost layer.

The display panel of the invention may be a device such as liquid crystal display panel, liquid crystal TV set, liquid crystal display, mobile phone, electronic paper or palmtop, etc.

According to an embodiment of the invention, the invention further provides a method for manufacturing a polarization structure, which includes:

Step S11: providing a substrate; and

Step S12: forming a polarization layer on the substrate, wherein the polarization layer includes: a transparent dielectric film; and an oriented nano-metal wire array distributed in the transparent insulating dielectric film.

In an embodiment of the invention, the polarization layer may be formed via a patterning process.

Specifically, the step of forming a polarization layer may include:

Step S111: forming a nano-metal wire array via a patterning process; and

Step S112: forming a transparent dielectric film on the nano-metal wire array; and when it requires to form a nano-metal wire array provided with multiple layers, step 11 and step 12 will be repeated in turn until a nano-metal wire array provided with multiple layers is formed.

In an embodiment of the invention, the patterning process specifically includes:

forming a nano-metal wire thin film;

coating a photoresist on the nano-metal wire thin film;

exposing and developing the photoresist, and forming a photoresist-reserved region and a photoresist-removed region;

removing the nano-metal wire thin film on the photoresist-removed region via an etching process; and peeling off the remaining photoresist to form an oriented nano-metal wire array.

In the embodiment of the invention, the polarization layer may also be formed via a polyvinylpyrrolidone (PVP)-induced process.

In an embodiment of the invention, the step of forming a polarization layer specifically comprises:

forming a nano-metal wires via a polyvinylpyrrolidone-induced process;

dispersing the nano-metal wires into the transparent dielectric solution; and coating the transparent dielectric solution containing the nano-metal wires on the base substrate, and performing nitrogen gas diffusion or stretch processing to form an oriented nano-metal wire array.

Nitrogen gas diffusion is similar to a process in which nano-metal wires are blown over by an air knife along a direction so as to orient the nano-metal wires.

Stretch processing is similar to the stretching of an ordinary sheet polarizer PVA, in which nano-metal wires are dispersed in a dielectric such as epoxy resin.

In an embodiment of the invention, the step of forming a nano-metal wires via a polyvinylpyrrolidone-induced process specifically comprises:

dissolving a metal nitrate in a glycol solution to obtain a first solution;

dissolving polyvinylpyrrolidone in a glycol solution to obtain a second solution; and adding the first solution and the second solution dropwise into a glycol solution at a first temperature, reacting by stirring to form nano-metal wires, wherein the first temperature is higher than or equal to 160° C.

In an embodiment of the invention, the metal nitrate may be a silver nitrate or an aluminum nitrate, and the nano-metal wire may be a nano-silver or a nano-aluminum. In an further embodiment of the invention, the metal nitrate may be a silver nitrate, and the nano-metal wire may be a nano-silver.

When the nano-metal wire is nano-silver wire, the dissolubility of the first solution may be 0.25 mol/L, and the dissolubility of the second solution may be 0.19 mol/L; the first temperature may be 160° C.

The diameter of the nano-metal wire according to the embodiment of the invention is in a range of 100-300 nm, and the length of the nano-metal wire is in a range of several microns to dozens of microns.

The above description shows some preferred embodiments of the invention. However, it should be noted that, various improvements and modifications may also be made by one of ordinary skills in the art without departing from the principles of the invention, and all these improvements and modifications should be construed as pertaining to the protection scope of the invention.

What is claimed is:

1. A polarization structure comprising a polarization layer, wherein the polarization layer comprises:

a transparent dielectric film; and an oriented nano-metal wire array that is distributed in the transparent dielectric film and oriented in a first direction, wherein the nano-metal wire array is provided with multiple layers, each layer comprises a plurality of oriented nano-metal wires which are arranged in a plurality of rows that are arranged in a second direction that is orthogonal to the first direction and a plurality of columns that extend in the first direction, the nano-metal wires in the same columns are parallel to each other, and the nano-metal wires in the same rows are arranged in an-end-to-end relationship that defines a line in the first direction, and wherein pitches between the nano-metal wires in a same row are equal to each other, and pitches between the nano-metal wires in a same column are equal to each other.

2. The polarization structure according to claim 1, wherein the transparent dielectric film is formed of silicon dioxide or a resin.

3. The polarization structure according to claim 2, wherein the resin is an epoxy resin.

4. The polarization structure according to claim 1, wherein the nano-metal wire is a nano-silver wire or a nano-aluminum wire.

5. The polarization structure according to claim 1, wherein the transparent dielectric film is an insulating transparent dielectric film.

6. The polarization structure according to claim 1, wherein the polarization structure further comprises:

a substrate, wherein the polarization layer is provided on the substrate, and the substrate is a base substrate, an array substrate or a color filter substrate.

7. A display panel comprising two polarization structures according to claim 1 that are provided correspondingly, wherein a light absorption axis of the polarization layer of the first polarization structure is orthogonal to that of the polarization layer of the second polarization structure.

8. The polarization structure according to claim 1, wherein materials of nano-metal wires are the same in different layers.

9. The polarization structure according to claim 1, wherein the pitches between the nano-metal wires in the same row are equal to the pitches between the nano-metal wires in the same column, wherein an average diameter and an average length of the nano-metal wires as well as the pitches between the nano-metal wires are provided so that a polarized light with a desired wavelength range is emitted by the polarization structure.

10. A method for manufacturing a polarization structure, comprising:
a step of forming a polarization layer, wherein the polarization layer comprises: a transparent dielectric film; and an oriented nano-metal wire array that is distributed in the transparent dielectric film in a first direction, wherein the step of forming the polarization layer comprises:
Step S111: forming a nano-metal wire array via a patterning process; and
Step S112: forming a transparent dielectric film on the nano-metal wire array; and
Step S111 and Step S112 are repeated in turn until a nano-metal wire array provided with multiple layers is formed, each layer comprises a plurality of oriented nano-metal wires which are arranged in a plurality of rows that are arranged in a second direction that is orthogonal to the first direction and a plurality of columns that extend in the first direction, the nano-metal wires in the same columns are parallel to each other, and the nano-metal wires in the same rows are arranged in an-end-to-end relationship that defines a line in the first direction, and
wherein pitches between the nano-metal wires in a same row are equal to each other, and pitches between the nano-metal wires in a same column are equal to each other.

11. The method according to claim 10, wherein the patterning process includes:
forming a nano-metal wire thin film;
coating a photoresist on the nano-metal wire thin film;
exposing and developing the photoresist, and forming a photoresist-reserved region and a photoresist-removed region;
removing the nano-metal wire thin film on the photoresist-removed region via an etching process; and
peeling off a remaining photoresist to form an oriented nano-metal wire array.

12. The method according to claim 10, wherein the step of forming the polarization layer comprises:
forming nano-metal wires via a polyvinylpyrrolidone-induced process;
dispersing the nano-metal wires into a transparent dielectric solution; and
coating the transparent dielectric solution containing the nano-metal wires on a base substrate, and performing nitrogen gas diffusion or stretch processing to form an oriented nano-metal wire array.

13. The method according to claim 12, wherein the step of forming nano-metal wires via a polyvinylpyrrolidone-induced process comprises:
dissolving a metal nitrate in a glycol solution to obtain a first solution;
dissolving polyvinylpyrrolidone in a glycol solution to obtain a second solution; and
adding the first solution and the second solution dropwise into a glycol solution at a first temperature, reacting by stirring to form nano-metal wires, wherein the first temperature is higher than or equal to 160° C.

14. The method according to claim 13, wherein the metal nitrate is a silver nitrate or an aluminum nitrate, and the nano-metal wire is a nano-silver or a nano-aluminum.

15. The method according to claim 13, wherein the metal nitrate is a silver nitrate, and the nano-metal wire is a nano-silver.

16. The method according to claim 13, wherein when the nano-metal wire is a nano-silver wire, the dissolubility of the first solution is 0.25 mol/L, and the dissolubility of the second solution is 0.19 mol/L, and the first temperature is 160° C.

17. The method according to claim 12, wherein the diameter of the nano-metal wire is in a range of 100-300 nm, and the length of the nano-metal wire is in a range of several microns to dozens of microns.

* * * * *